US010909174B1

(12) United States Patent
Martin et al.

(10) Patent No.: US 10,909,174 B1
(45) Date of Patent: Feb. 2, 2021

(54) STATE DETECTION OF LIVE FEED

(71) Applicant: Amazon Technologies, Inc., Seattle, WA (US)

(72) Inventors: Paul Martin, Seattle, WA (US); Michael Bartholomew, Seattle, WA (US); Steve Huynh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/266,979

(22) Filed: Feb. 4, 2019

(51) Int. Cl.
*G06F 16/783* (2019.01)
*G06N 20/20* (2019.01)
*G06F 16/75* (2019.01)
*G06K 9/34* (2006.01)
*H04L 29/06* (2006.01)
*G06K 9/00* (2006.01)

(52) U.S. Cl.
CPC .......... *G06F 16/7834* (2019.01); *G06F 16/75* (2019.01); *G06K 9/00228* (2013.01); *G06K 9/344* (2013.01); *G06N 20/20* (2019.01); *H04L 65/601* (2013.01); *H04L 65/608* (2013.01)

(58) Field of Classification Search
CPC ..... G06F 16/7834; G06F 16/75; G06N 20/20; G06K 9/00228; G06K 9/344; H04L 65/601; H04L 65/608
See application file for complete search history.

(56) References Cited

U.S. PATENT DOCUMENTS

| | | | | |
|---|---|---|---|---|
| 9,548,048 | B1* | 1/2017 | Solh | ........................ G10L 15/24 |
| 2007/0162924 | A1* | 7/2007 | Radhakrishnan | .. G06K 9/00718 725/18 |
| 2007/0250777 | A1* | 10/2007 | Chen | ........................ G10L 25/00 715/723 |
| 2009/0144785 | A1* | 6/2009 | Walker | .................... H04N 5/262 725/105 |
| 2011/0280540 | A1* | 11/2011 | Woodman | ........... H04N 21/4307 386/201 |
| 2012/0290516 | A1* | 11/2012 | Frank | ....................... G06F 3/013 706/12 |
| 2014/0321831 | A1* | 10/2014 | Olsen | .................... G11B 27/034 386/241 |
| 2015/0317801 | A1* | 11/2015 | Bentley | .................. H04N 7/181 382/107 |
| 2015/0373281 | A1* | 12/2015 | White | ................... G11B 27/002 348/660 |

(Continued)

*Primary Examiner* — Tadesse Hailu
(74) *Attorney, Agent, or Firm* — Kilpatrick Townsend & Stockton LLP

(57) ABSTRACT

Embodiments of the present disclosure are directed to, among other things, a system that may receive a stream of data content that corresponds with a content classification. A machine learning (ML) model may be selected based at least in part on the metadata and/or content classification. The data content may be inputted to the ML model and an output from the ML model may indicate that data content is associated with the content classification, a start location, and an end location of the stream of data content. The stream of data content may be truncated or cut by removing portions of the stream of data content that fall before the start location and after the end location. The remaining portion of the stream may be stored as a file and provided to the user device.

22 Claims, 9 Drawing Sheets

(56) References Cited

U.S. PATENT DOCUMENTS

| | | | |
|---|---|---|---|
| 2016/0105708 A1* | 4/2016 | Packard | H04N 21/23439 725/10 |
| 2016/0266330 A1* | 9/2016 | Zhang | G02B 6/3895 |
| 2016/0292881 A1* | 10/2016 | Bose | G06K 9/00342 |
| 2017/0289589 A1* | 10/2017 | Koumchatzky | H04N 21/251 |
| 2017/0289617 A1* | 10/2017 | Song | H04N 21/8456 |
| 2018/0020243 A1* | 1/2018 | Ni | G11B 27/031 |
| 2018/0025078 A1* | 1/2018 | Quennesson | G11B 27/031 725/141 |
| 2018/0033147 A1* | 2/2018 | Becker | G06T 7/11 |
| 2018/0082123 A1* | 3/2018 | Katz | G06N 20/00 |
| 2018/0082717 A1* | 3/2018 | Bose | G01P 13/00 |
| 2018/0084309 A1* | 3/2018 | Katz | G06F 16/7837 |
| 2018/0084310 A1* | 3/2018 | Katz | G06N 20/00 |
| 2018/0144042 A1* | 5/2018 | Sheng | G06F 40/186 |
| 2018/0150713 A1* | 5/2018 | Farooqi | G06N 20/00 |
| 2018/0176661 A1* | 6/2018 | Varndell | G06F 40/197 |
| 2018/0285773 A1* | 10/2018 | Hsiao | G06N 5/04 |
| 2019/0205651 A1* | 7/2019 | Chang | G06N 20/00 |
| 2019/0259290 A1* | 8/2019 | Lynch | G16H 50/30 |
| 2019/0260764 A1* | 8/2019 | Humphrey | G06N 20/20 |
| 2019/0273837 A1* | 9/2019 | Townsend | H04N 1/2108 |
| 2019/0304140 A1* | 10/2019 | Fuller | G06T 11/001 |
| 2019/0356948 A1* | 11/2019 | Stojancic | G06T 7/12 |
| 2020/0074229 A1* | 3/2020 | AlShikh | G06F 40/30 |

* cited by examiner

| Start Time | End Time | Count | Player 1 | Player 2 | ... |
|---|---|---|---|---|---|
| 0:30 | A | 1 | John | Jane | |
| 0:30 | | 2 | Sam | Sandy | |
| 0:45 | | 3 | Bob | Betty | |
| B | C | 1 | D | E | |

FIG. 6

STATE DETECTION OF LIVE FEED

BACKGROUND

Live streaming audio or video content over a data network is becoming more prevalent. Users can receive content streams at their mobile device and view the content throughout the day. Some live streams correspond with a channel guide that includes a title of the content, a start time, and an end time. However, as with any live performance, the information is quickly out-of-date. Football games, for example, can progress into overtime and push the published end time past its expected conclusion. The channel guide, in turn, is often inaccurate. Improvements to these live streaming systems are required.

BRIEF DESCRIPTION OF THE DRAWINGS

Various embodiments in accordance with the present disclosure will be described with reference to the drawings, in which:

FIG. 6 illustrates a metadata table, according to at least one example;

DETAILED DESCRIPTION

Figure 1:
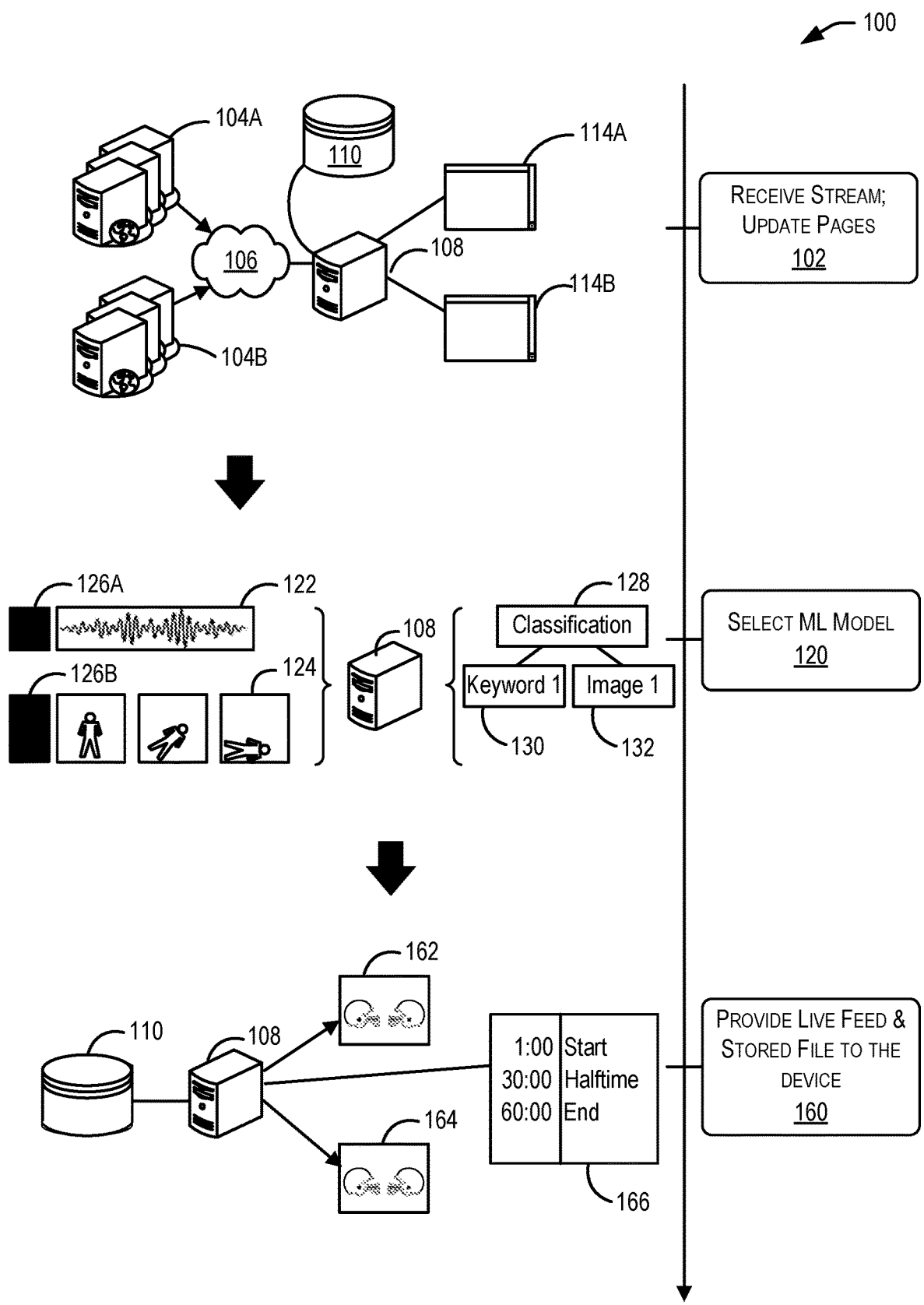
FIG. 1 illustrates a state detection system, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for determining a state in a stream of data content (e.g., audio stream, video stream, etc.). For example, the system may receive a stream of data content from a second computer system and update a network page to provide the stream of data content to a user device. The network page may correspond with metadata that accompanies the stream of data content. In some examples, the stream of data content may correspond with a content classification. A machine learning (ML) model may be selected based at least in part on the metadata and/or content classification. For example, the ML model may have been previously trained for the content classification of the data content. The computer system may input the data content to the ML model and an output from the ML model may indicate that data content is associated with the content classification, a start location, and an end location of the stream of data content. The stream of data content may be truncated or cut by removing portions of the stream of data content that fall before the start location and after the end location. The remaining portion of the stream may be encoded and stored as a file and provided to the user device. In some examples, the file provided to the user device may also correspond with a plurality of data tags that identify locations in the file that correspond with events depicted in the stream of data content.

In an illustrative example, a football game is expected to occur on Sunday. A first computing system can receive a notification that the football game will occur at a particular start and end time. This system can establish a communication channel between itself and a second computer system to accept the video stream associated with the football game. This communication channel may display a blank image (e.g., black screen, static color bars, etc.) in a video stream of data or remain silent in an audio stream of data, until the stream is transmitted by the second computer system. On Sunday, the expected transmission of the football game would begin and, by doing so, would update the communication channel from its blank or silent state to an altered state that provides audio or video. The first computing system may identify the initiation of the data stream as a start location of the data stream and generate a data tag associated with that information. Using a machine learning model that corresponds with the "football" category, other attributes of the data stream may be identified and the corresponding location in the data stream may be stored as data tags as well, including a start of game, kickoff, start of halftime, end of halftime, timeouts, end of game, and end location of the data stream. These and other data tags may be associated with the data stream so that particular locations in a stored version of the football game may be accessed as a video file at a later time.

The illustrated system provides several technical improvements to conventional systems. For example, the identification of data tags may be automated to remove human interaction associated with data streams. This may allow a plurality of data streams to be received and tagged simultaneously, and in real time, at the first computer system. The same simultaneous data analysis would be unavailable with only a human operator. As such, the system can require a computer implementation in a distributed, electronic environment.

Additionally, some embodiments of the system may implement a machine learning (ML) model that correlates the data stream with a content classification of video content. For example, the ML model that correlates with the data stream may identify a football theme. The data tags associated with this ML model may correspond with football, whereas a different ML model may correspond with a different sport or category classification, including tennis or a non-video data feed (e.g., limited to audio data content only). For example, a kickoff data tag may not correspond with a tennis match. By incorporating the ML model associated with the category classification, some data tags may be assumed to correspond with the data stream and other data tags may be removed from consideration. This may allow for more efficient electronic communications.

FIG. 1 illustrates a state detection system, according to at least one example. The process 100 can begin with receiving a stream of audio or video content 102. For example, one or more computer systems 104 (illustrated as computer system 104A and computer system 104B) may transmit one or more streams of content via a network 106 to a first computer system 108. In some examples, the streams of data content may comprise audio and video data, only audio data, only video data, or other data content associated with a text-based system. The one or more streams of data content (e.g., a plurality of simultaneous data streams, a stream of data received at least two hours prior to the start location of the content, etc.) may comprise continuous streams of content or portions of content (e.g., 2-second packages of data, etc.) that are transmitted via the network 106.

The transmission may include metadata about the content (e.g., in the same transmission, as a header file, or in a second transmission as a separate data file, etc.). The metadata may include information about the stream of video content, including a content classification or category (used interchangeably) that describes the type of video content received in the stream of video content. The content classification may include, for example, a type of event associated with the stream of data or a team or individual presented with the stream of data. The first computer system 108 may encode the stream of data content as a video file and store the encoded file and/or metadata in a data store or buffer 110.

The transmission may include text data as well, including closed caption information that corresponds with a stream of data content (e.g., audio or video). The text data may comprise a transcription of the audio portion of the stream of data content (e.g., dialogue, sound effects, musical cues, etc.) and/or descriptions of non-speech elements. In some examples, the text data may comprise translations of the dialogue to a foreign language. The text data may include time tags that associate the audio or video data with the text data The transmission may include multiple audio streams for a single stream of data content. For example, a stream of video content may correspond with a football game and the transmission may comprise a first set of commentators that speak a first language, a second set of commentators that speak a second language, and a third set of commentators that share a common characteristic (e.g., all from Washington, all women, etc.).

The first computer system 108 may also update one or more network pages 114 (illustrated as network page 114A and network page 114B) to provide the data content to a user device. For example, the first computer system 108 may update a network page to provide the video content as a video file that is accessible by the user device. The user device may access the network page through a software application stored with the user device (e.g., a browser application, or a software application limited to viewing streaming video content, etc.) or may access the network page remotely via a communication network (e.g., a client device or application programming interface (API), etc.). In some examples, the network page may correspond with the content classification that matches the video content.

The process 100 may select a machine learning (ML) model at 120. The ML model may be selected from a plurality of machine learning (ML) models that each correspond with a content classification. For example, a first ML model may correspond with a content classification corresponding with a football game. A second ML model may correspond with a content classification corresponding with a tennis match. In another example, a first ML model may correspond with a sports game where Acme Co. is playing and a second ML model may correspond with a sports game where Beta Co. is playing. These and other examples are provided throughout this disclosure.

In some examples, the ML model may be selected by identifying a ML model that corresponds with the metadata that accompanies the video content. For example, the metadata of the video content may comprise a first content classification. The ML model may correspond with a second content classification. When the first content classification matches the second content classification, the ML model corresponding with that shared content classification may be selected and applied to analyze the video content.

The ML model may be trained to identify attributes of new streams of video content by using prior streams of video content. For example, a first ML model may be trained to identify a kickoff in a new stream of a football game. The images or video portions in the video content may be compared with the training data set of the first ML model. The training data set may correlate a kickoff data tag with events, images, audio, and the like in previous football games. The aspects of the video stream, including a start or end time, image analysis, audio, keywords, and the like may correlate the location (e.g., 0:00, 1:00, 1:30, etc.) and the video content with a data tag. The start location and the end location may be two examples of data tags that correspond with the video content. In some examples, the start location and the end location may not correspond with a beginning of a data stream or an end of a data stream, such that the start location is after a beginning of a stream of video content and/or the end location is before an end of the stream of video content. Additional information associated with the model training is provided with FIG. 3 and FIG. 4 of this disclosure.

Once the ML model has been trained and selected, the stream of video content may be input to the ML model and output may be received from the ML model. The output may indicate that the video content is associated with a content classification, a start location, and an end location of the stream of video content. Other data tags and corresponding locations in the data content may be identified as well. The first computer system may encode the video file, output from the ML model, and/or any metadata in a data store or buffer.

As a sample illustration, the stream of content may comprise an audio segment 122 or a video segment 124. Either segment may be preceded by a blank screen, absence of audio/video, or silence 126 (e.g., illustrated as audio silence 126A and a video black screen 126B) which can indicate an absence of content. The ML model may identify a start location associated with the audio segment 122 by identifying a transition between the audio silence 126A and the audio segment 122, which can identify a change in audio level. In another example, the ML model may identify a start location associated with the video segment 124 by identifying a transition between the video black screen 126B and the video segment 124, which can identify a change in the video property of the video content. In yet another example, the ML model may identify a start location associated with the video segment 124 by identifying a transition between a bars and tones histogram and the video segment 124, which can identify a change in the video property of the video content.

In some examples, multiple audio streams may be analyzed to identify the one or more data tags associated with the stream of video content. For example, a commentator from the first set of commentators may identify half time of the football game by saying the "halftime begins" or playing an audio clip at the beginning of the halftime segment, yet the other sets of commentators may not say the same word or play the same audio clip. The ML model may incorporate the signals in various audio streams as further indicators of data tags within the stream of data content.

In some examples, the output from the ML model may differ from the metadata received from the second computer system. The first computer system 108 may update one or more data tags stored in association with the stream of video content to correspond with output from the ML model instead of the metadata received from the second computer system.

The ML model may also correspond with a content classification. As stored in a data store, the content classification 128 may correspond with a data tree that correlates a particular content classification 128 with one or more keywords 130, one or more images 132, or other data. The identified data tree for the content classification may be associated with the particular ML model, such that a plurality of data trees are available for analysis. In some examples, the stream of video content may correspond with metadata that identifies the content classification of the video content. When the content classification from the metadata is identified, additional information associated with the content classification that has been stored in the data tree. The data tree may be correlated with the stream of video content as well. In some examples, the first computer system 108 may traverse the data tree to identify the keywords and images for the content classification and store these keywords and images with the data stream in a data store or buffer 110.

Based at least in part on identifying a start location and an end location of the stream of video content, the first computer system 108 may truncate or cut the stream of video content by removing portions of the stream that fall before the start location and after the end location. The remaining portion of the stream of video content may be encoded and/or stored as a video file with the data store or buffer 110. The first computer system 108 may also store any corresponding data tags in the data store or buffer 110.

The process 100 may provide the stored video file and/or stream of video content to a user device at 160. For example, the first computer system 108 may transmit the stream of video content 162 via the generated network page 114 as the stream is received from the second computer system (e.g., corresponding with an event occurring in real time). In another example, the first computer stem 108 may transmit the video file 164 stored with data store or buffer 110 (e.g., at a time after the original stream transmission). The video file 164 may correspond with the metadata and/or output from the ML model to identify data tags 166 that correspond with the video file 164.

In some examples, the first computer system 108 may transmit a notification to a user device. The notification may identify the stored video file and/or one or more data tags associated with the video file, or may identify that this information is available to access by the user device. The notification may be generated after a start location is identified with data content. In some examples, the notification may be generated and/or transmitted based at least in part on identifying an end location in the stream of video content (e.g., generated as soon as the video content ends, etc.). In some examples, the notification may be generated and/or transmitted prior to identifying the end location in the stream of video content (e.g., generated as soon as the video content begins, etc.).

Figure 2:
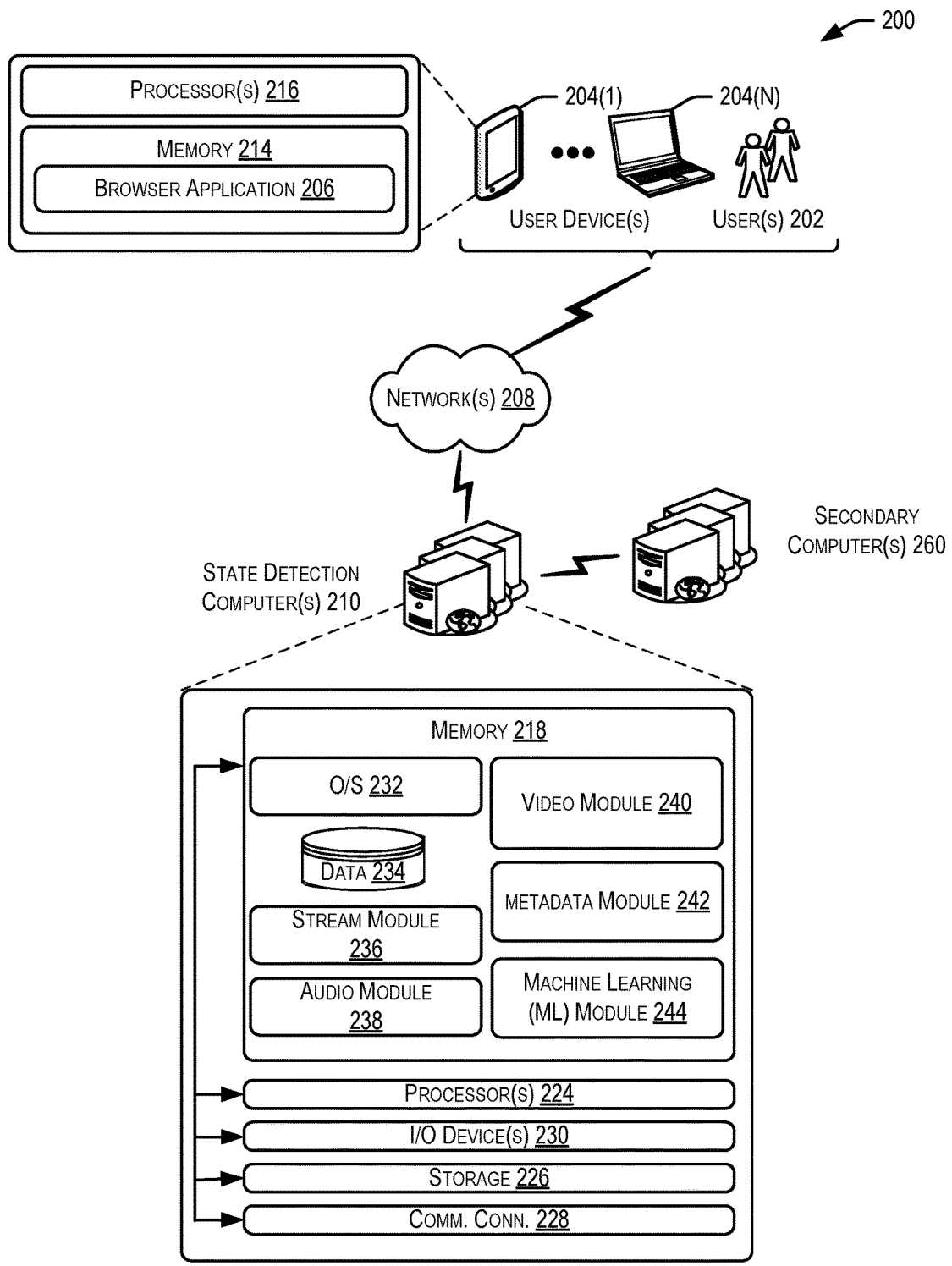
FIG. 2 illustrates an architecture for detecting a state described herein that includes a state detection computer and/or a user device connected via one or more networks, according to at least one example.

FIG. 2 illustrates an architecture for detecting a state described herein that includes a state detection computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more state detection computers 210. The one or more state detection computers 210 may, in some examples, provide computing resources such as, but not limited to, client entities, low latency data storage, durable data storage, data access, management, virtualization, cloud-based software solutions, electronic content performance management, etc. The one or more state detection computers 210 may also be operable to provide web hosting, computer application development, and/or implementation platforms, combinations of the foregoing, or the like to the one or more users 202. The one or more state detection computers 210, in some examples, may help detect a state in a stream of audio/video content using a ML model and/or provide audio/video content to one or more user devices 204.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the state detection computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more state detection computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the state detection computers 210 via the networks 208, or via other network connections. Additionally, the user devices 204 may be part of the distributed system managed by, controlled by, or otherwise part of the state detection computers 210 (e.g., a console device integrated with the state detection computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website (e.g., for displaying streaming media content) or other interface for interacting with the state detection computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the state detection computers 210 may be unique types of computing devices including, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the state detection computers 210 may be in communication with the user devices 204 and/or other service providers via the networks 208, or via other network connections. The state detection computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the state detection computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of state detection computers 210, the memory 218 may be volatile (such as RAM) and/or non-volatile (such as ROM, flash memory, etc.). The state detection computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the state detection computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the state detection computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The state detection computers 210 may also contain communications connection(s) 228 that allow the state detection computers 210 to communicate with a stored database, another computing device or server, user terminals, and/or other devices on the networks 208. The state detection computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a stream module 236, an audio module 238, a video module 240, a metadata module 242, and/or a machine learning (ML) module 244. The modules may be software modules, hardware modules, or a combination thereof. If the modules are software modules, the modules will be embodied on a computer readable medium and processed by a processor in any of computer systems described herein.

The stream module 236 may be configured to receive a stream of data content from one or more sources. The stream module 236 may also be configured to receive the streams of data content simultaneously and/or in real time. In some examples, the stream module 236 may be configured to store the multiple streams of data content in various data stores and conduct the analysis of the stream of data content, for example by assigning data tags, based at least in part on a machine learning (ML) model. The analysis may occur simultaneously as well.

The audio module 238 may be configured to receive a stream of audio content from one or more computer systems and analyze the audio content using one or more algorithms. For example, the audio module 238 may be configured to identify an audio fingerprint, frequency, tone, or identify one or more keywords in the audio segment. In some examples, the audio module 238 may be configured to transcribe or parse the audio to translate the audio to textual data, and store the resulting data in data store 234. In some examples, the audio module 238 may be configured to identify and analyze audio from a video file.

The video module 240 may be configured to receive a stream of video content from one or more computer systems and analyze the video content using one or more algorithms. For example, the video module 240 may be configured to identify a color distribution of the video, implement a facial or other image recognition algorithm, or generate a bars and tones histogram of the stream of video content.

The metadata module 242 may be configured to receive metadata that corresponds with audio or video content, including metadata in a header file or as a separate electronic message from the audio or video content. In some examples, the metadata module 242 may be configured to compare output from the machine learning (ML) model with metadata that is provided from a second computer system. The metadata module 242 may be configured to determine whether the two sources of metadata match and update the data store 234 with information from the output from the ML model (e.g., replacing the metadata received from the second computer system, etc.).

The ML module 244 may be configured to receive input and provide output corresponding with data content. The ML module 244 may train and maintain at least one ML model for each content classification that corresponds with the data content. The ML module 244 may, for example, receive a stream of video content and apply a ML model corresponding with a content classification to the stream of video content, when the stream of video content also corresponds with the content classification. The output of the ML module 244 may indicate that the video content is associated with the content classification and one or more data tags including a start location and an end location of the stream of video content. Various data tags and their corresponding locations may be identified in the stream of video content by the ML module 244.

The state detection computers 210 may also correspond with one or more secondary computers 260. The one or more secondary computers 260 may comprise memory, processor, I/O devices, storage, and other hardware or software features that are similar to the state detection computer 210. In some examples, output determined by the state detection computer 210 may be provided to the secondary computers 260 that is local or within the same network as the state detection computers 210. In these examples, the stream of data content and/or resulting video files that correspond with various data tags may remain within a local network (e.g., not provided to one or more user devices 204).

Figure 3:
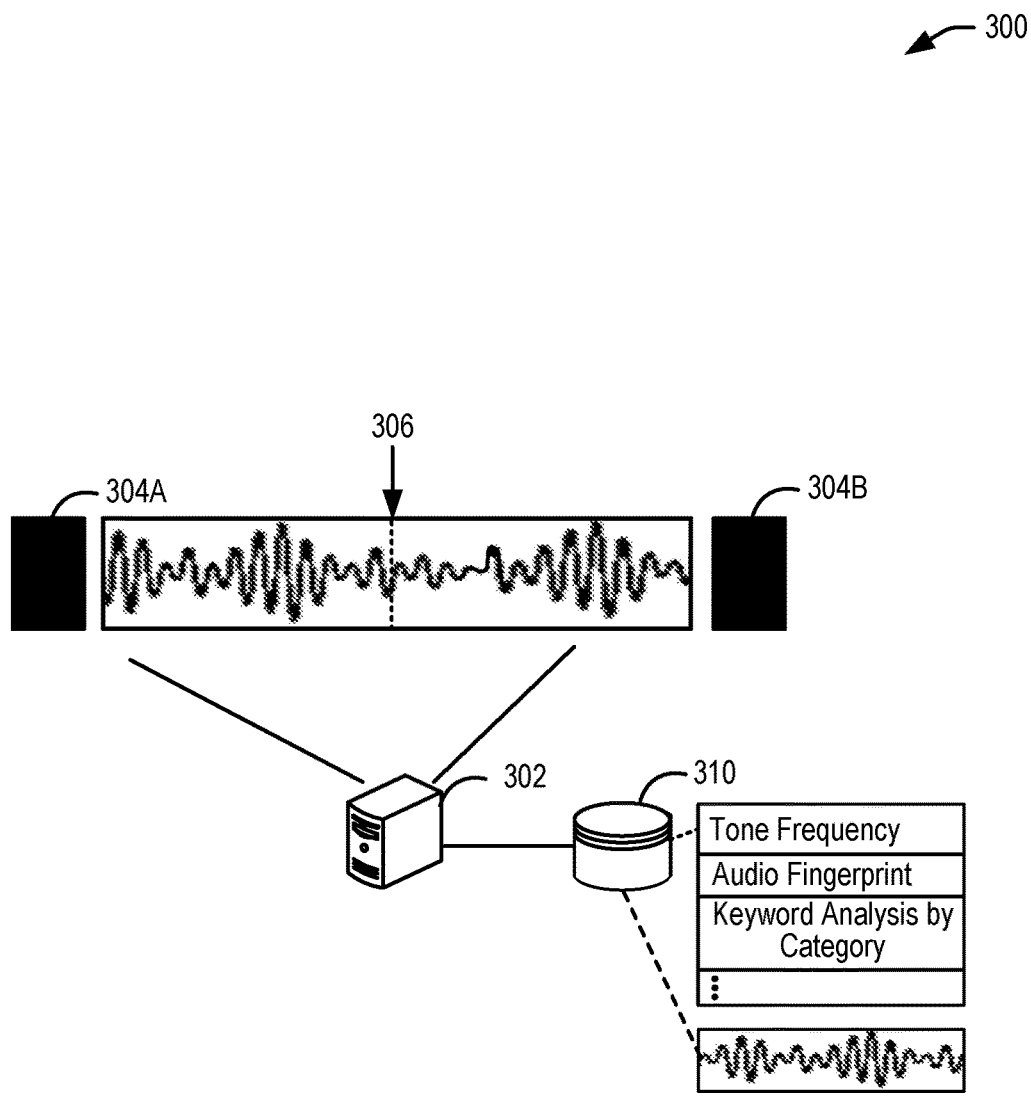
FIG. 3 illustrates an audio analysis of a state detection computer system, according to at least one example.

FIG. 3 illustrates an audio analysis of a state detection computer system, according to at least one example. In illustration 300, a computer system 302 may receive a stream of audio content 306 from a second computer system. In some examples, the computer system 302 may correspond with the state detection computers 210 described with FIG. 2.

The stream of audio content 306 may be received via a communication channel between the computer system 302 and a second computer system and via a communication network. The communication channel may be established between at least two systems at a time prior to receiving the stream of audio content 306. In some examples, the communication channel may be the silent 304 before and/or after the stream of audio content 306 is received by the computer system 302 (illustrated as silent before 304A and silent after 304B).

The computer system 302 may analyze the stream of audio content 306 using a variety of improved algorithms. In some examples, the analysis of the stream of audio content 306 may identify one or more data tags that correspond with locations in the audio content to identify one or more events. As a sample illustration, a stream of audio content may correspond with a content classification associated with a radio show (e.g., based on the metadata, etc.). The computer system 302 may input the stream of audio content into the machine learning (ML) model. The output of the ML model may identify one or more data tags. A first data tag at 1:00 of the stream of audio content 306 may correspond with a start of a radio show. The start of the radio show may be at least one event that corresponds with the audio content. A second data tag at 2:00 of the stream of audio content 306 may correspond with a first commercial break of the radio show. These and other data tags (e.g., a start of a show, a start of a commercial break, etc.), for example, may be selected based at least in part on the determined content classification (e.g., a radio show) of the audio content.

The computer system 302 may determine the location of the first data tag by identifying a frequency shift between the portion of the audio content that is silent 304 and not silent. The data tag may identify the location in the stream of audio content of the frequency shift. The data tag may identify the location in the audio content corresponding with the end of a silent audio portion and the beginning of the not silent audio portion.

The audio content 306 may comprise spatial and/or temporal frequency data. The computer system 302 may analyze the audio content 306 using a frequency analysis based at least in part on the frequency data of the audio content that accompanies the stream. The data tag may identify the location in the stream of audio content based at least in part on the spatial and/or temporal frequency data.

The audio content 306 may be compared with previous audio files that are identified in a training data set associated with the ML model of the determined content classification. The portion of the audio content that is most similar to portions of previous audio files may be determined to correspond with one or more data tags. Other comparison algorithms are available as well, including comparing the content classification included in the metadata of the audio content 306 with a second content classification corresponding with the previous audio files that are identified in the training data set. Upon identifying a match between these two content classifications, the audio content 306 may be determined to correspond with the particular ML model based at least in part on the matching content classification.

In some examples, the comparison between the audio content 306 and previous audio files may include a frequency analysis, including a Fourier transform that can be applied in the frequency domain of the audio data (e.g., the first data and/or the second data, data from multiple sources, etc.). For example, a fast Fourier transform (FFT) may be implemented. During the analysis, the audio signal may be compared with sinusoids of various frequencies to obtain a magnitude coefficient of each data source. If the coefficient is large in comparison to a coefficient threshold, there may be a high similarity between the signal and the sinusoid and the signal may contain a periodic oscillation at that frequency. When two or more data sources are analyzed, this may determine that the data may be similar. If the coefficient is small in comparison to the coefficient threshold, there may be little to no similarity between the signal and the sinusoid, which can identify that the periodic oscillation is present at a different frequency. When two or more data sources are analyzed, including the audio content 306 as one of the data sources, this may determine that the data may not be similar and a different ML model may be used.

In some examples, the process may also extract or identify portions of the audio content 306, including a unique portion of the audio. For example, the data transmission may comprise a multiplexing process to combine multiple analog or digital signals into a single signal and transmitted via a network (e.g., cable, VPN, etc.). The computer system may perform demultiplexing to extract or identify different audio portions (e.g., associated with different portions of an audio spectrum, etc.).

In some examples, unique portions of the audio may correspond with a particular event. For example, a particular song may be played at the beginning of a live event like a football game. The computer system 302 may implement an audio analysis of the stream of audio content and detect the audio corresponding with the song. Based at least in part on the detection, the computer system 302 may determine that the live event is about to begin at the particular location of the stream of video content.

In some examples, the computer system 302 implement a keyword recognition algorithm. For example, the computer system 302 may parse and/or transcribe audio from the stream of content to generate a transcription of keywords and other data from the audio stream. In some examples, the transcription may correspond with the video content as well. When metadata corresponding with the stream of data content is different than the transcription of keywords, the metadata may be updated to correspond with the transcription. In some examples, the transcription may help determine the content classification that corresponds with the audio content. In some examples, the transcription data may be used to update a guide or other information (e.g., to identify a start or end time of a streaming event, etc.).

Upon determination of the similarities between the audio content 306 and the previous audio files, data tags may be identified at various locations of audio content based at least in part on previously identified locations of the previous audio files. For example, a start location and an end location may be identified with the audio content 306. The computer system 302 may truncate the stream of audio content 306 by removing portions of the stream that fall before the start location and after the end location. The remaining portion of the audio stream may be encoded and/or stored between the start location and the end location as an audio file in a data store.

Figure 4:
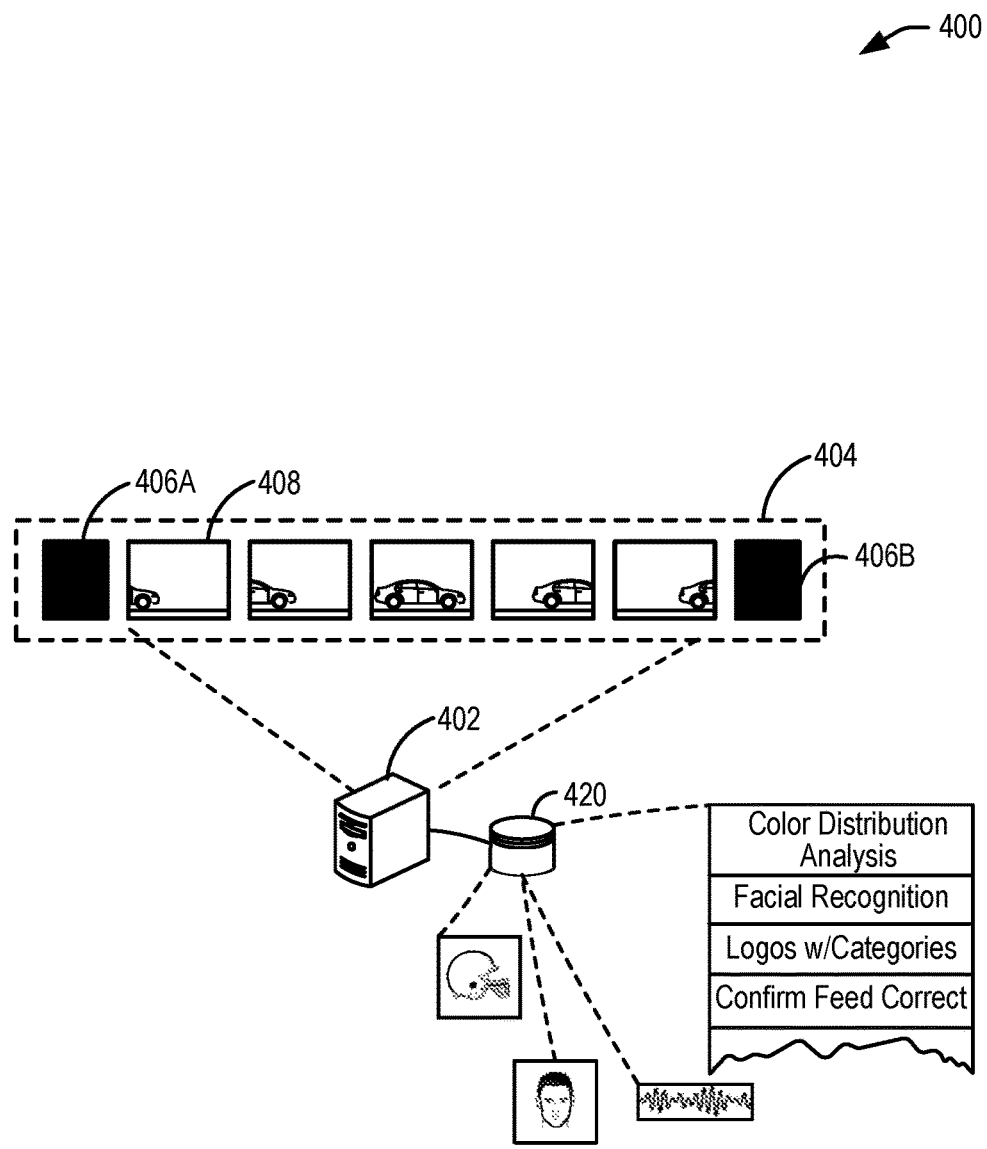
FIG. 4 illustrates a video analysis of a state detection computer system, according to at least one example.

FIG. 4 illustrates a video analysis of a state detection computer system, according to at least one example. An illustration 400, a computer system 402 may receive a stream of video content 404 from a second computer system. In some examples, the computer system 402 may correspond with the state detection computers 210 described with FIG. 2.

The video content 404 may be received from a second computer system as a portion of video content. For example, the video content 404 may begin with a blank or static image or silence 406 (illustrated as 406A and 406B). The start location of the video content 404 may correspond with the location of the stream of video content that changes between a blank image 406 and a non-blank image 408. The end location of the video content 404 may correspond with the location of the stream of video content that changes back from the non-blank image 408 to another blank image 406.

The video content 404 may be received in portions of data via the communication channel over a network. For example, the video content 404 may be transmitted from the second computer system to the first computer system 402 in two-second portions of non-blank images 408, or as a continuous stream of data. In some examples, multiple, continuous streams of data may be received by the first computer system 402. Other time durations or methods of transmission are available without diverting from the essence of the disclosure.

The stream of video content 404 may be received via a communication channel between the first computer system 402 and a second computer system. The communication channel may be established between at least two systems at a time prior to receiving the stream of video content 404. In some examples, the communication channel may be the silent 406 before and/or after the stream of video content 404 is received by the first computer system 402 (illustrated as silent before 406A and silent after 406B).

The first computer system 402 may determine one or more key frames in the stream of video content 404. For example, a key frame may correspond with a start or end image of any smooth transition in the video. A sequence of key frames may define which movement the user may see whereas the position of the key frame in the video may define the timing or location of the movement within the video file.

The first computer system 402 may analyze the stream of video content 404 using a variety of improved algorithms. In some examples, the analysis of the stream of video content 404 may use these improved algorithms to identify one or more data tags that correspond with locations in the video content to identify one or more events.

The first computer system 402 may implement a color distribution analysis on one or more frames of the video content. The color distribution analysis of a first frame compared to a second frame at a later point of time of the video content may identify that the video image has changed between the two points of time. In this example, the color distribution analysis may identify that the video is progressing and exists after a start location and/or before an end location.

The first computer system 402 may implement a facial recognition algorithm on one or more frames of the video content. The facial recognition algorithm may identify facial features of an individual depicted in the video. The image from the video content may be compared with facial features of known individuals to help identify an individual depicted in the video. In some examples, the first computer system 402 may correlate individuals with content classifications. When the individual is identified in the video content, the video content may correspond with the content classification associated with the individual. A similar image recognition algorithm may be implemented for logos or trademarks as well (e.g., irrespective of facial features).

The first computer system 402 may confirm that the content classification identified with metadata that accompanies the stream of video content is correct. For example, using the facial recognition algorithm, the first computer system 402 may identify a first content classification corresponding with an individual depicted in the video. When the metadata that accompanies the stream of video content is associated with a second content classification that is different than the first content classification, the first computer system 402 may update the content classification for the video to correspond with the first content classification identified in association with a facial recognition algorithm.

The facial recognition algorithm may also identify one or more data tags in the video content. For example, the individual depicted in the video may correspond with a commentator and the first computer system 402 may identify that the location of the video content corresponds with a timeout, halftime, or break in the event when the commentator is visible in the video content. In some examples, the commentator may be identified in the metadata and the identification of the commentator may be compared and used to confirm that the metadata is correct and/or the location of the data tag(s).

Similar confirmation methods are also available. For example, the first computer system 402 may initiate an audio transcription associated with the stream of video content. One or more keywords associated with a first content classification may be identified from the transcription. When the metadata that accompanies the stream of video content is associated with a second classification that is different than the content classification identified in the transcription, the first computer system 402 may update the content classification of the video to correspond with the first content classification identified in association with the transcription.

The facial recognition algorithm may also be implemented in conjunction with a weighted analysis. For example, the facial recognition algorithm may identify a particular individual associated with more than one content classification (e.g., a commentator that opines on multiple types of sports games, or an athlete that participates in a game and is interviewed later about the game during a talk show, etc.). The first computer system 402 may identify the individual in addition with other analyses, including for example an audio analysis, to identify one or more keywords and an image analysis to identify one or more logos are trademarks in the video content. A weight may be applied to the identification of these data points and provided as input to the machine learning (ML) model. The output of the ML model may help identify the appropriate data tags and locations in the video content (e.g., when compared with previous video content that is compared with the current video content, etc.). In some examples, the weighted analysis may be used to ignore data that is irrelevant to the potential content classifications, which can create more efficient data processing.

The first computer system 402 may implement a histogram analysis, including a bars and tones analysis, on the video content. For example, a blank video image may correspond with a portion of the video stream prior to broadcasting a live event. The histogram analysis may identify that the bars and tones of the image correspond with a location of the video feed that occurs prior to the broadcast. In some examples, multiple key frames of the video may correspond with the static image to identify that the static image continues to be transmitted prior to receiving the broadcast at the first computer system 402.

Figure 5:
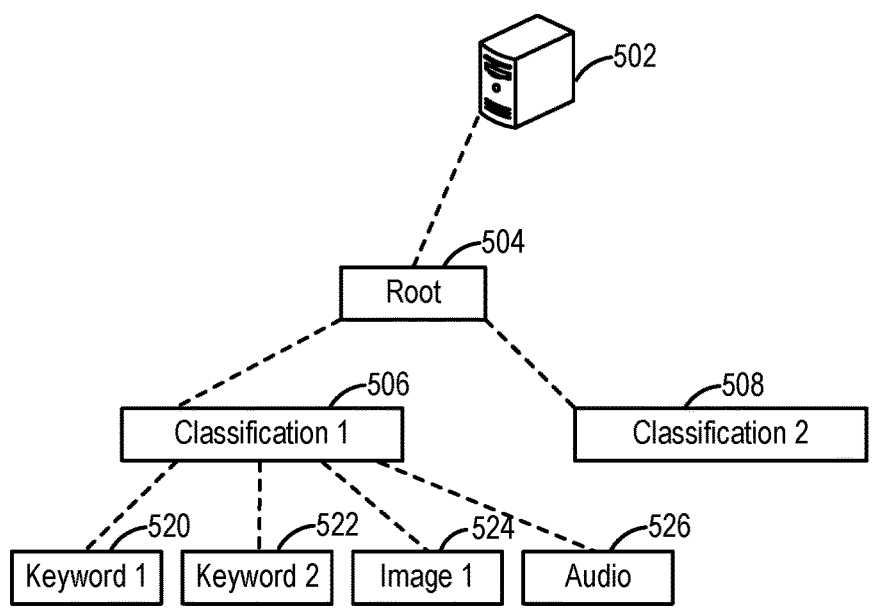
FIG. 5 illustrates a category data tree, according to at least one example.

FIG. 5 illustrates a category data tree, according to at least one example. In illustration 500, computer system 502 may generate and maintain a category data tree associated with categories of audio content, video content, and ML models. For example, audio content or video content may correspond with metadata. The metadata may comprise, for example, a content classification that can identify a type of event, individual, expected start or end location of the audio content or video content, or other data tags identified in the output of the ML model.

The category data tree may identify relationships between the content classifications stored with the tree. For example, a root classifier 504 may identify a common category associated with two different content classifications, including a first content classification 506 and a second content classification 508. In a sample illustration, the root classifier 504 may correspond with "sports" and the sub content classifications 506 and 508 may correspond with "football" and "tennis," respectively.

Each content classification identified in the category data tree may correspond with a different ML model. For example, the first content classification 506 may correspond with a first ML model and the second content classification 508 may correspond with a second ML model. In some examples, a stream of video content that corresponds with the first content classification 506 (e.g., as identified in metadata) may be provided as input to the first ML model. The output from the first ML model may identify the start location and the end location of the stream of video content based at least in part on the first ML model.

The computer system 502 may traverse the category data tree. For example, metadata that corresponds with data content may identify the first content classification 506. The computer system 502 may traverse the category data tree to a broader content classifier, illustrated as the root classifier 504, and then traverse the category data tree to a narrower content classifier, illustrated as the second content classification 508. In this example, the first content classification 506 and the second content classification 508 may be related by sharing the root category (e.g., two types of sports or live events).

The category data tree may identify additional data associated with existing content classifications. For example, when data content is associated with the first content classification 506, the computer system 502 may identify a first keyword 520, a second keyword 522, image 524, or audio 526 that the computer system 502 can expect to identify in the data content. These known data types may be identified from other data corresponding with the identified content classification from the category data tree.

FIG. 6 illustrates a metadata table, according to at least one example. In illustration 600, a sample data table 602 is provided. For example, in the first row, the metadata that corresponds with the stream of video content may identify an expected start location (e.g., 0:30) and two players in a tennis match (e.g., John and Jane). The second row of metadata may identify a second tennis match that is expected to correspond with the same start location (e.g., 0:30) as the first tennis match and simultaneously be received by the computer system. The third row of metadata may correspond with a third tennis match and a slightly delayed start location (e.g., 0:45) in comparison to the first two tennis matches.

In some examples, the first computer system may identify the actual start location of the tennis match in the stream of video content. When the start location matches the expected start location received in the metadata, the metadata table may remain unchanged. Otherwise, the table may be updated based at least in part on the output of the ML model.

The first computer system may also identify the end location 604 of the tennis match in the stream of video content. As illustrated throughout the disclosure, the end location may correspond with the algorithms described herein, including an image analysis or audio analysis, to identify the end of the broadcast and the corresponding location may be stored as the end time in the data table 602.

When a second event is identified after the end location of the first event, new data may be added to the data table 602. For example, the stream of video content may be truncated by removing portions of the stream of video content falling before the start location and after the end location. The first video file may be stored to correspond with this portion between the start location and location. Additional data may be identified after the end location and in the same stream of video content. In this example, the computer system may identify a second start location and start to generate a second video file until a second identified end location. The second start location 606, the second end location 608, and any additional data tags (e.g., individuals included with the video file and identified from a facial recognition algorithm including Player 1 610 and Player 2 612) may also be added to the data table 602.

The data table 602 may be updated based at least in part on output from the ML model. For example, the metadata may identify a first player 614 and the output of the ML model may identify a different player (e.g., using the facial recognition algorithm described herein). In some examples, the data table 602 may be updated with the individual identified in the output of the ML model (e.g., change player Jim to player John).

Figure 7:
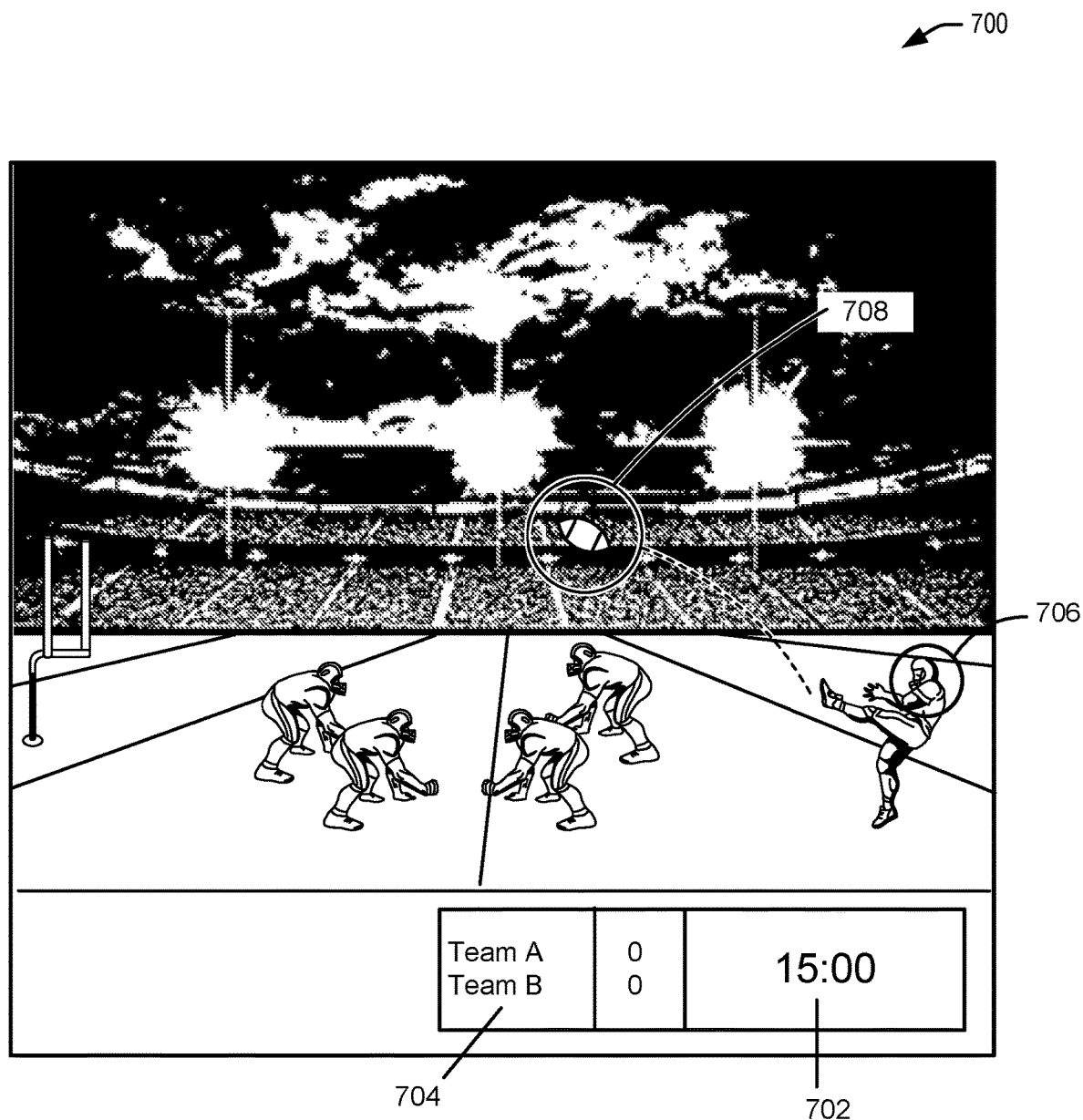
FIG. 7 illustrates video content and interactions with a machine learning model, according to at least one example.

FIG. 7 illustrates video content and interactions with a machine learning model, according to at least one example. In illustration 700, a sample image or key frame from a stream of video content is provided. Various portions of the image may be analyzed to identify data tags in the video content.

For example, a lower right portion of an image may identify a clock 702 corresponding with a live event. The first computer system may implement an optical character recognition (OCR) algorithm to identify that the time on the clock corresponds with a start of the game. The start of the game and/or location of the clock, for example, may correspond with the particular ML model selected by the first computer system for the particular video content.

In another example, the first computer system may identify one or more logos, team names, or trademarks in the sample image or key frame. The identification 704 of Team A and Team B, for example, may be based on an OCR algorithm or audio analysis from a commentator that discusses Team A and Team B. The identification of Team A and Team B from these analyses may help confirm that the live event is a football game, which can match the metadata corresponding with the stream of video content, which also identified a football game.

In another example, the first computer system may implement a facial recognition algorithm to identify individual 706. The facial features of individual 706 may be compared with facial features of known individuals. When individual 706 is identified, additional information associated with this recognition may be added to a data table corresponding with the video content. In some examples, when individual 706 is associated with Team A, for example, the first computer system may confirm that this team is participating in the live event associated with the stream of video content and potentially update the metadata to include Team A.

In another example, the first computer system may identify a repetitive event 708 that may be unique to this type of content classification. For example, when an image of a football is flying in front of an image of a crowd in a stadium, the first computer system may identify a kickoff event. The data tag corresponding with the identified kickoff may be stored with the data store. The time in the data content or location of the beginning and the end of kickoff may be stored with the data store as well.

Other events, data tags, and analyses may be implemented without diverting from the essence of the disclosure.

Figure 8:
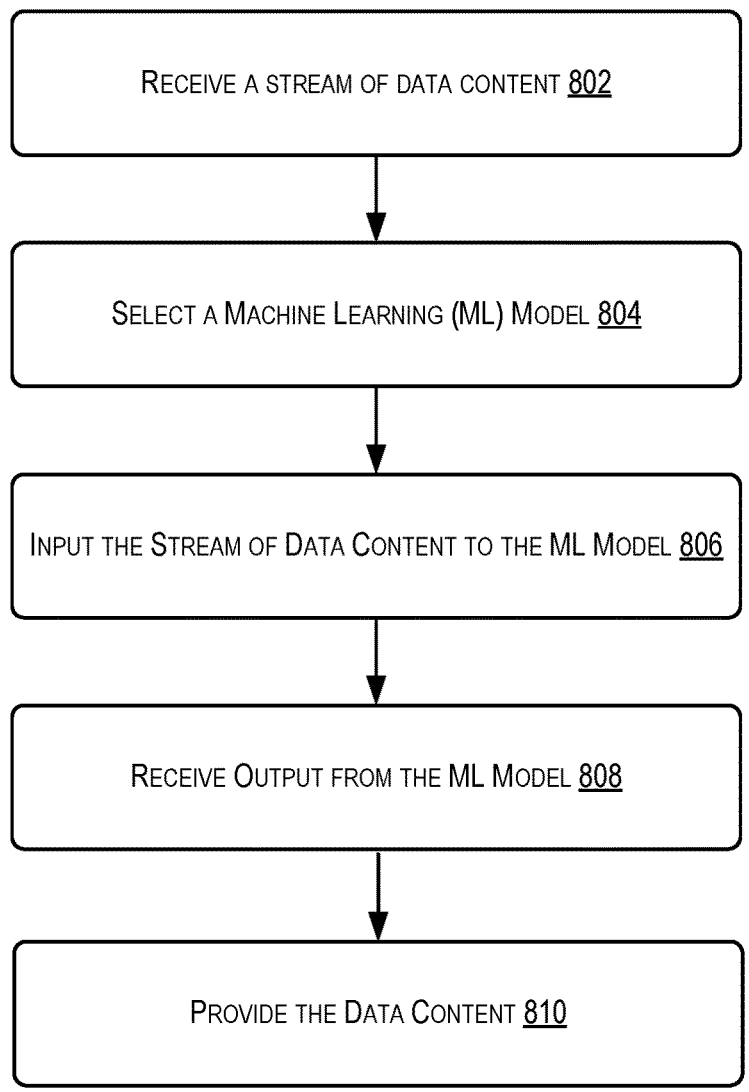
FIG. 8 illustrates a process for determining a state in a data stream, according to at least one example.

FIG. 8 illustrates a process for determining a state in a data stream, according to at least one example. In some examples, the one or more state detection computers 210 (e.g., utilizing at least one of the stream module 236, the audio module 238, the video module 240, the metadata module 242, and/or the machine learning (ML) module 244) or one or more user devices 204 shown in FIG. 2 may perform the process 800 of FIG. 8.

Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 800 may begin at 802 by receiving a stream of data content. For example, the state detection computer system 210 may receive the stream of data content. The data content may comprise audio, text, and/or video data. The stream of data content may be received from a second computer system.

In some examples, the state detection computer system 210 may update a network page to provide the video content to a user device. The update to the network page may comprise adding a play button or other navigation tools in order to encourage interaction between user device and the network page. In some examples, the network page may be previously generated at a time prior to receiving the stream of video content and may be updated upon receiving the stream of video content to correspond with and provide the stream. The network page may also be associated with metadata about a content classification of the data content.

At 804, a machine learning (ML) model may be selected. For example, the state detection computer system 210 may select the ML model from a plurality of ML models. The selection of the ML model may be based at least in part on metadata. The ML model may be previously trained for the content classification of the data content.

At 806, the stream of data content may be provided to the ML model. For example, the state detection computer system 210 may provide the stream of data content as input to the ML model.

At 808, output may be received from the ML model. For example, the state detection computer system 210 may receive output indicating that the data content is associated with one or more data tags. In some examples, the output may indicate the content classification, a start location, and an end location of the stream of data content.

In some examples, the stream of data content may be truncated or cut by removing portions of the stream of data content in order to produce or generate a new video file. For example, the state detection computer system 210 may generate the video file by removing portions of the stream of data content before the start location and after the end location identified by the ML model. The remaining portion of the stream between the start location and the end location may be stored as the data file (e.g., encoded as a video file, audio file, etc.). The new video file may be stored with a data store.

At 810, the data content may be provided. For example, the state detection computer system 210 may provide the data file to the user device at the network page. The state detection computer system 210 may also provide the stream of data content to the user device at the network page. In some examples, the data file and/or the stream of data content may be provided to the user device upon request for the data content.

Figure 9:
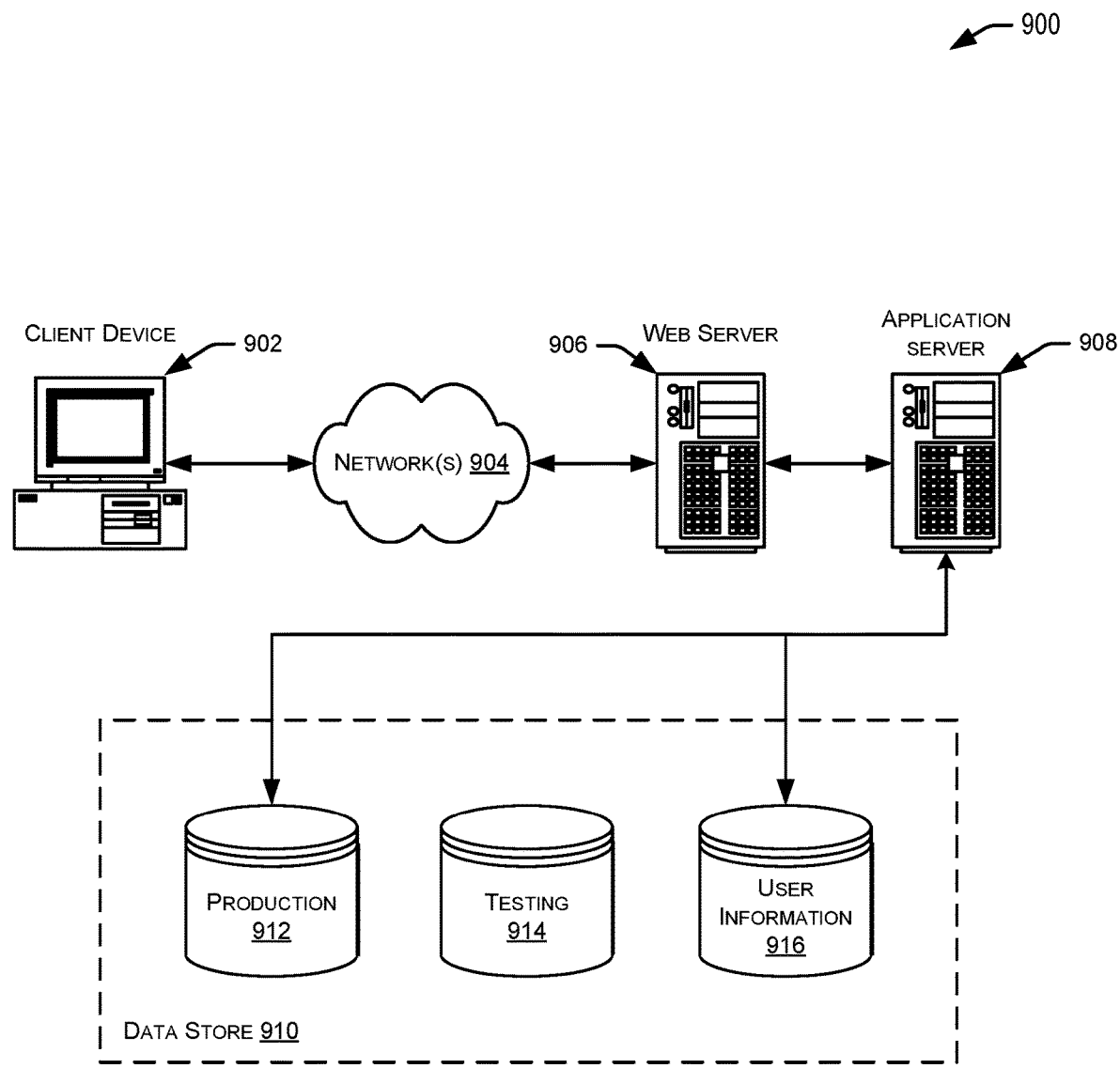
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a first computer system, a stream of video content from a second computer system, the stream corresponding to a broadcast of a live event;
   updating, by the first computer system, a network page to provide the video content to a user device, the network page associated with metadata about a content classification of the video content;
   selecting, by the first computer system, a machine learning (ML) model from a plurality of machine learning (ML) models, each one of the plurality of ML models being previously trained for a different content classification, the selection of the ML model based at least in part on a match between the content classification and a corresponding content classification for which the ML model was previously trained;
   inputting, by the first computer system, the stream of video content to the ML model in real time relative to the broadcast;
   receiving, by the first computer system from the ML model, output indicating that the video content is associated with the content classification, a start location, and an end location of the stream of video content;
   generating, by the first computer system and based at least in part on the output of the ML model, a video file by truncating the stream of video content, the truncating comprising removing portions of the stream of video content falling before the start location and after the end location that are indicated by the output of the ML model;
   storing, by the first computer system and in a network location, a remaining portion of the stream of video content between the start location and the end location as the video file;
   including, by the first computer system, a network address of the video file at the network location; and
   providing the video file to the user device based at least in part on a request for the video content at the network page.

2. The computer-implemented method of claim 1, wherein the ML model is trained to detect changes in audio level, and wherein the detection of the start location and the end location is based at least in part on a change in the audio level.

3. The computer-implemented method of claim 1, wherein the content classification comprises a genre of the video content and a type of event shown in the video content, wherein the ML model is trained to detect changes in a video property of the video content and on the genre and the type, wherein the ML model is selected based at least in part on the genre and the type, and wherein the detection of the start location and the end location is based on a change in the video property.

4. The computer-implemented method of claim 1, wherein the first computer system receives a plurality of streams of video content simultaneously, wherein video content comprises a plurality of events between the start location and the end location, wherein the ML model was previously trained to output an indication of each one of the plurality of events based at least in part on the content classification, and wherein generating the video file comprises indicating each of the plurality of events based at least in part on the output of the ML model.

5. One or more computer-readable storage media collectively storing computer-executable instructions that, when executed by one or more computer systems, configure the one or more computer systems to collectively perform operations comprising:
   receiving, by a first computer system, a stream of data content from a second computer system;
   selecting, by the first computer system, a machine learning (ML) model from a plurality of machine learning (ML) models, each one of the plurality of ML models previously trained for a different content classification, the selection of the ML model based at least in part on a match between a content classification of the data content and a corresponding content classification for which the ML model was previously trained;
   inputting, by the first computer system, the stream of data content to the ML model;
   receiving, by the first computer system from the ML model, output indicating that the data content is associated with the content classification, a start location, and an end location of the stream of data content;

generating, by the first computer system and based at least in part on the output of ML model, a data file by truncating the stream of data content, the truncating comprising removing portions of the stream of data content falling before the start location and after the end location that are indicated by the output of the ML model;

storing a remaining portion of the stream of data content between the start location and the end location as the data file; and providing the data file to a user device based at least in part on a request for the data content.

6. The one or more computer-readable storage media of claim 5, the operations further comprising:

updating, by the first computer system, a network page to provide the data content to the user device, the network page associated with metadata about the content classification of the data content; and providing the data file at the network page.

7. The one or more computer-readable storage media of claim 5, wherein the content classification is a type of event associated with the stream of data content.

8. The one or more computer-readable storage media of claim 5, wherein the content classification is a team or individual presented with the stream of data content.

9. The one or more computer-readable storage media of claim 5, wherein the stream of data content is preceded by silence or an absence of video images.

10. The one or more computer-readable storage media of claim 5, wherein the stream of data content is received for at least two hours prior to the start location.

11. The one or more computer-readable storage media of claim 5, the operations further comprising:

applying a facial recognition algorithm to the stream of data content; and updating metadata associated with the classification based at least in part on output of the facial recognition algorithm.

12. The one or more computer-readable storage media of claim 5, the operations further comprising:

applying a keyword recognition algorithm to the stream of data content; and updating metadata associated with the classification based at least in part on output of the keyword recognition algorithm.

13. The one or more computer-readable storage media of claim 5, wherein the stream of data content corresponds with an event occurring in real time.

14. A state detection computer system, comprising:

a memory that stores computer executable instructions; and a processor configured to access the memory, wherein the processor is configured to execute the computer executable instructions to collectively at least:

receive a stream of video content from a second computer system;

select a machine learning (ML) model from a plurality of machine learning (ML) models, each one of the plurality of ML models previously trained for a different content classification, the selection of the ML model based at least in part on a match between a content classification of the video content and a corresponding content classification for which the ML model was previously trained;

input the stream of video content to the ML model;

receive, from the ML model, output indicating that the video content is associated with the content classification and comprising a plurality of data tags associated with locations within the stream of video content;

store, based at least in part on the output a portion of the stream of video content as a video file, the portion of the stream of video content corresponding with at least some of the plurality of data tags; and provide the video file to a user device at a network page based at least in part on a request for the video content.

15. The state detection computer system of claim 14, the processor being further configured to:

based at least in part on receiving the output from the ML model, encoding the video file.

16. The state detection computer system of claim 14, wherein the stream of video content is transmitted from the second computer system in two-second portions of data.

17. The state detection computer system of claim 14, the processor being further configured to:

generate and transmit a notification based at least in part on identifying an end location in the stream of video content.

18. The state detection computer system of claim 14, the processor being further configured to:

generate a notification based at least in part on identifying a start location; and transmit the notification prior to identifying an end location.

19. The state detection computer system of claim 14, the processor being further configured to:

transcribe audio from the stream of video content, the transcription comprising a keyword and a location of the keyword from the audio; and updating metadata associated with the classification to include the keyword and the location of keyword.

20. The state detection computer system of claim 14, the processor being further configured to:

identify a key frame from the stream of video content.

21. The state detection computer system of claim 14, the processor being further configured to:

generate a bars and tones histogram;

based at least in part on analyzing the bars and tones histogram, determine that the stream of video content comprises a static image at a location of the stream of video content for a predetermined amount of time; and update metadata associated with the classification to include the location of the static image.

22. The state detection computer system of claim 14, the processor being further configured to:

receive a transmission of text data, wherein the output from the ML model identifies the data tags based at least in part on the text data.

* * * * *